Nov. 7, 1967  C. E. KENNEDY ETAL  3,351,243
RANGE FEEDER APPARATUS
Filed June 2, 1966  5 Sheets-Sheet 1

INVENTORS
CARL E. KENNEDY &
WILEY E. REYNOLDS, JR.
BY
Cushman, Darby & Cushman
ATTORNEYS Nov. 7, 1967    C. E. KENNEDY ETAL    3,351,243
RANGE FEEDER APPARATUS
Filed June 2, 1966        5 Sheets-Sheet 2

INVENTORS
CARL E. KENNEDY
WILEY E. REYNOLDS, JR.

BY *Cushman, Darby & Cushman*
ATTORNEYS

Nov. 7, 1967  C. E. KENNEDY ETAL  3,351,243
RANGE FEEDER APPARATUS
Filed June 2, 1966  5 Sheets-Sheet 3
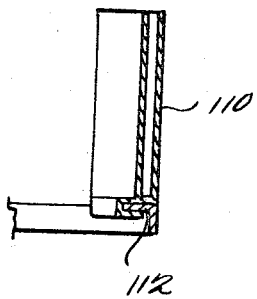
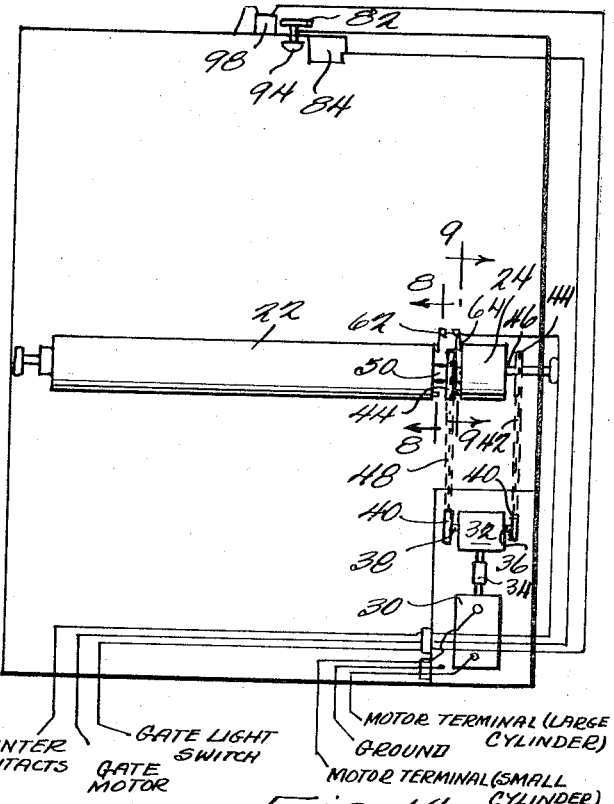
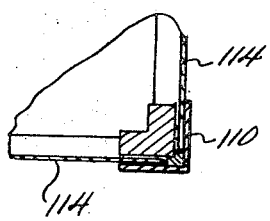
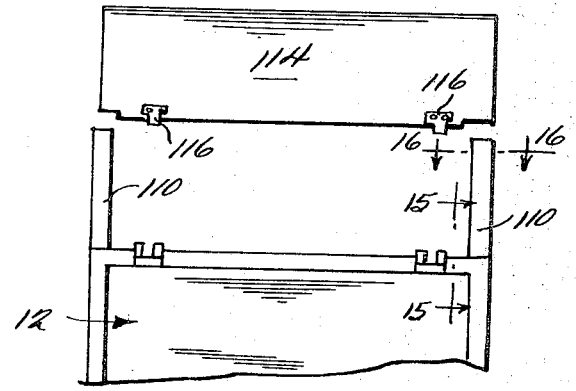
INVENTORS
CARL E. KENNEDY &
WILEY E. REYNOLDS, JR.
By Cushman Darby & Cushman
ATTORNEYS Nov. 7, 1967  C. E. KENNEDY ETAL  3,351,243
RANGE FEEDER APPARATUS
Filed June 2, 1966  5 Sheets-Sheet 4
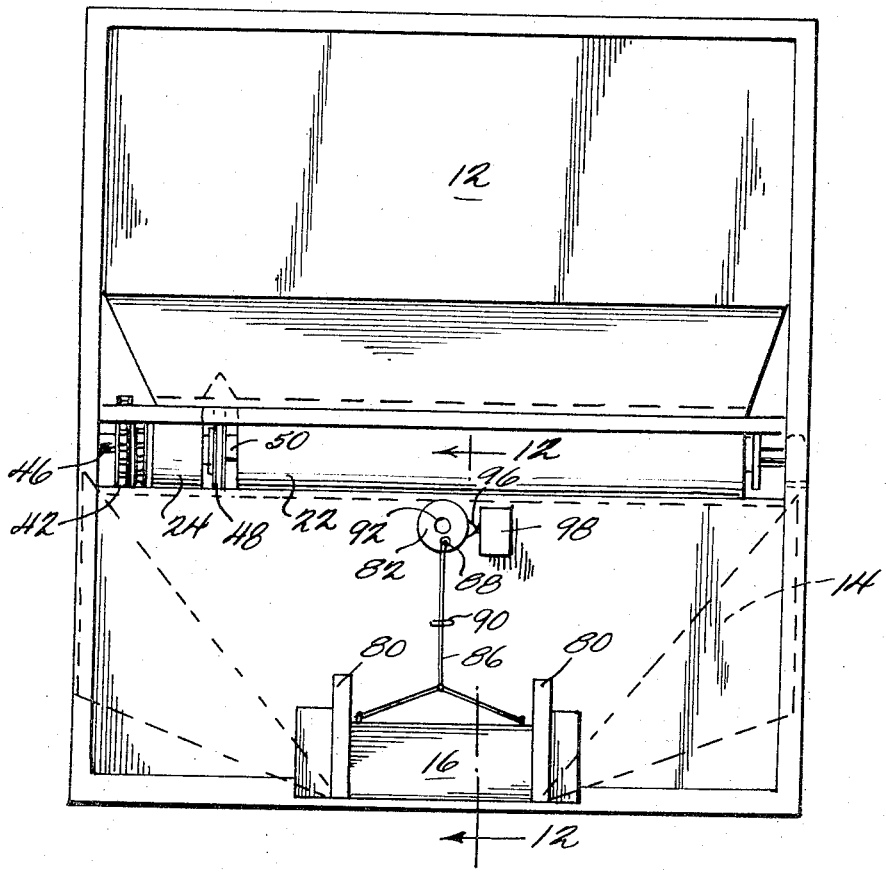
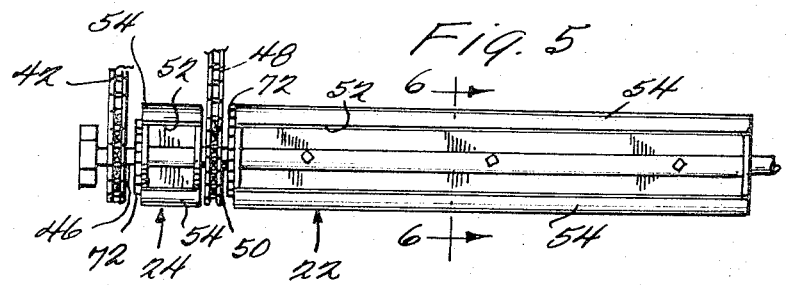
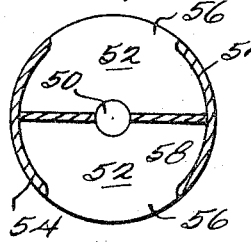
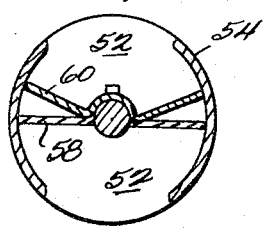
INVENTORS
CARL E. KENNEDY &
WILEY E. REYNOLDS, JR.
BY Cushman, Darby & Cushman
ATTORNEYS

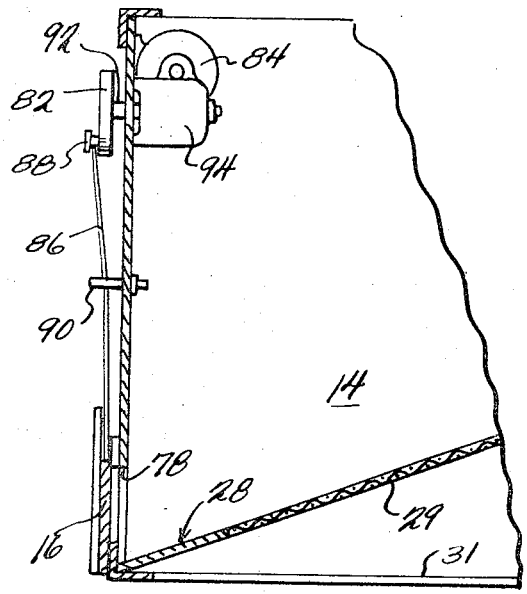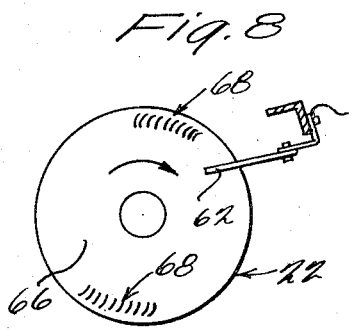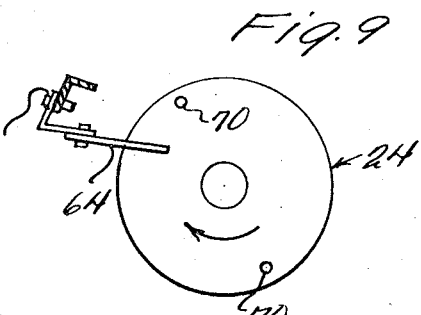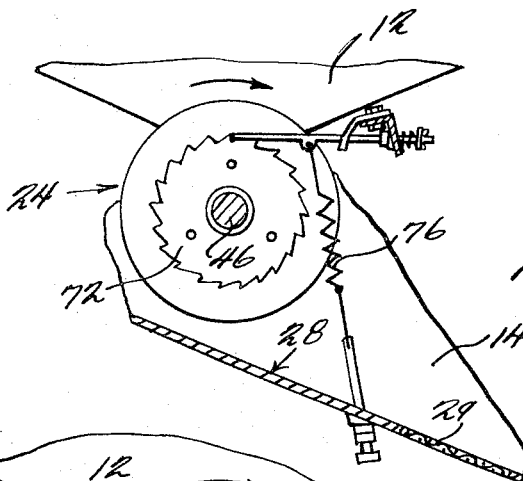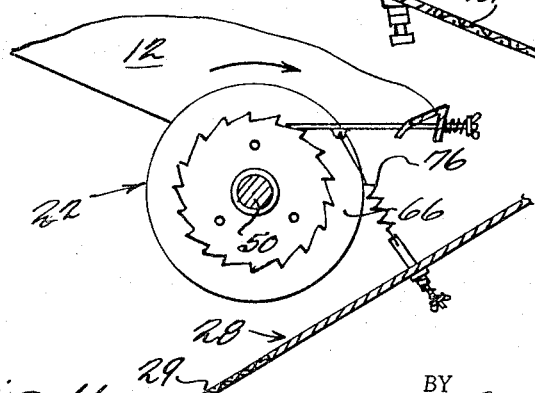

United States Patent Office 3,351,243
Patented Nov. 7, 1967

3,351,243
RANGE FEEDER APPARATUS
Carl E. Kennedy, Box 2435, and Wiley E. Reynolds, Jr., Box 961, both of Pampa, Tex. 79065
Filed June 2, 1966, Ser. No. 554,724
8 Claims. (Cl. 222—189)

This invention relates to measuring and dispensing apparatus and is particularly concerned with portable apparatus for dispensing known quantities of livestock feed from a hopper carried on a truck or other vehicle.

In present day range feeding of livestock, it is a practice to periodically take pelletized feed to all points in a range where groups of livestock are grazing. Usually the feed is carried by a pickup truck to the various locations, and it is necessary to manually dispense a quantity of feed from the truck for each group of livestock. Of course, the number of livestock in any single group varies considerably, and therefore care must be taken to dispense an amount of feed for each group which will closely approximate the supplementary or other diet requirements for all of the livestock in the group. In the past, this approximation has been made by manually dispensing a rough estimate of the amount needed, and the quantity dispensed was necessarily inaccurate for controlling the amount of feed given per head of livestock.

The present invention provides for a portable feeder unit which can be easily mounted on and removed from the open body of a pickup truck, or other vehicle. The feeder unit includes a storage bin for holding a relatively large quantity of livestock feed, and two rotatable measurement cylinders of differing capacities are arranged at the base of the hopper to separately measure and discharge known quantities of feed from the hopper. The measurement cylinders discharge the selected quantities of feed into a screening and receiving bin where crumbs and fines are screened out and where feed is held for ultimate dispensing onto the ground at a range feeding location. However, the dispensing of feed from the receiving bin does not take place until a gate mechanism, associated with the receiving bin, is opened by a control mechanism. In this manner, the operation of measuring a desired quantity of feed may take place without an immediate dispensing of the feed onto the ground, and the dispensing step may be delayed until optimum discharge conditions exist.

The feeder unit is operated by a control device which may be installed in the cab of the truck carrying the unit. The control device can be driver-actuated to rotate the measurement cylinders and also to dispense the measured feed onto the ground. The measurement cylinders are rotated by an actuating mechanism which includes an electrically powered reversible motor drivingly connected to a gear reduction box. The gear reduction box has two opposed output shafts which are each connected through one-way clutch bearings to the two separate measurement cylinders. An operation of the electric motor in a first direction drives one of the measurement cylinders, while an operation in a reverse direction will drive the other measurement cylinder. By controlling the driving direction of the motor, a selection of a particular measurement cylinder can be made, and the differing measurement capacities of the two cylinders may be used in combinations which give desired total quantities of feed to be dispensed at a particular location.

Thus, an operator may drive the truck to a first group of cattle and count the number of head in the group. By knowing the recommended feeding quantities of a particular feed for each head of cattle he can calculate the quantity, for example the number of pounds, of feed required for the group. Then, he can operate the control unit to charge the larger of the two measurement cylinders for a number of rotations which closely approximates the required amount. After the larger measurement cylinder has been operated to dump the approximate quantity into the receiving bin, the smaller measurement cylinder is then operated to dump smaller quantities into the receiving bin, bringing the total amount accurately up to the amount required. Then, the rancher can drive the truck near the group of cattle and release a dispensing gate associated with the receiving bin. The feed is scattered by continuing to drive the truck around the group while the dispensing gate is open, and only the pre-measured quantity is dispensed from the truck. In this manner, there is an accurate control of feed quantities per head of livestock, and the dispensing operation is entirely automatic. No manual dispensing effort is required with the apparatus of this invention, and the entire feeding operation can be carried out by a driver of a vehicle and without having to leave the cab of the vehicle during the entire trip of range feeding.

The invention also provides a means for adjusting the capacities of the separate measurement cylinders so that they can be adjusted to various sizes and weights of feed pellets, or feed cake. Further, the storage bin can be adjusted to hold greater quantities of feed, whenever necessary.

These and other advantages of the present invention will become apparent in the more detailed discussion which follows, and in that discussion reference will be made to the accompanying drawings in which:

FIGURE 3 is a top plan view of the driving mechanism for the two separate measurement cylinders, and also illustrates control means for the measurement cylinders;

FIGURE 4 is an end view of the apparatus as seen from the dispensing end of the receiving bin;

FIGURE 5 is a detailed top plan view of the measurement cylinders used with the apparatus of this invention;

FIGURE 6 is a cross-sectional view of one of the measurement cylinders and showing the measuring pockets contained therein, as taken on line 6—6 of FIGURE 5;

FIGURE 7 is a cross-sectional view similar to FIGURE 6 and showing an adjustment means added to the measuring pocket to adjust the volume of material which can be received within the pocket;

FIGURE 8 is an end view of the larger measurement cylinder taken on line 8—8 of FIGURE 3 and illustrating counter contacts for that cylinder;

FIGURE 9 is an end view of the smaller measurement cylinder taken on line 9—9 of FIGURE 3 and illustrating counter contacts for that cylinder;

FIGURE 10 illustrates a stop gear mechanism associated with a first one of the measurement cylinders for preventing a reverse rotation of that cylinder while the adjacent cylinder is being operated;

FIGURE 11 shows a structure similar to that illustrated in FIGURE 10 for a second of the measurement cylinders;

FIGURE 12 is a side elevational section taken on line 12—12 of FIGURE 4 and showing detail of the operating mechanism for lifting a dispensing gate;

FIGURE 13 is a schematic view of control circuits associated with a control unit for the apparatus;

FIGURE 14 illustrates a means for adjusting the capacity of the storage bin for the unit by adding panels to the storage bin;

FIGURE 15 is a detailed view of the structure shown in FIGURE 14, as taken on line 15—15 of FIGURE 14; and FIGURE 16 is a further detailed view of the FIGURE 14 structure, as taken on line 16—16 of that figure.

Figure 1:
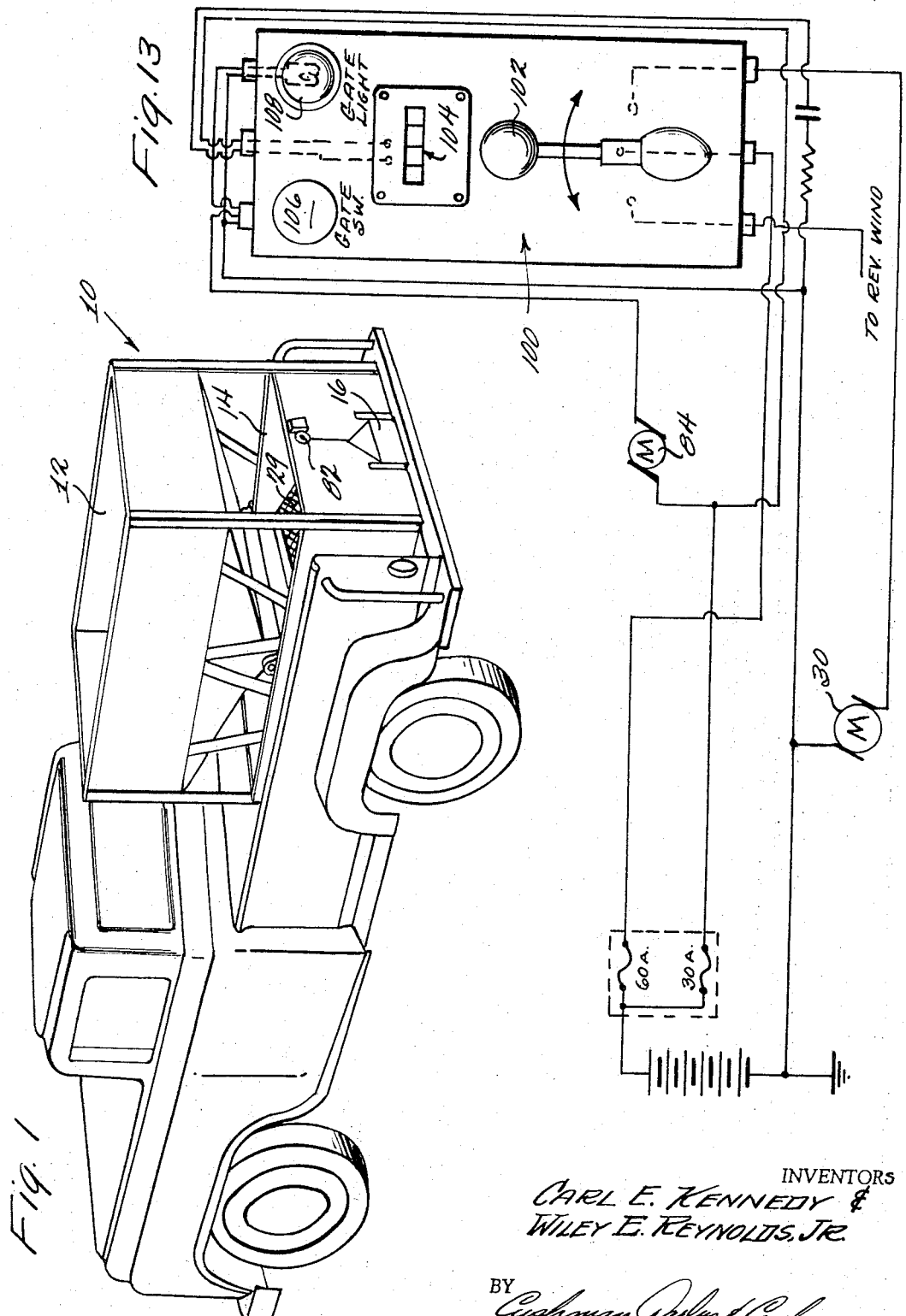
FIGURE 1 illustrates a perspective view of the feeder apparatus as installed in the bed of a pickup truck.

Referring to FIGURE 1, the range feeder apparatus is indicated generally at 10 and is shown in a mounted position in the open body portion of a pick-up truck. The dimensions of the feeder are selected so that the entire device can be easily mounted into a truck body for easy removal when it is necessary to use the truck for other purposes. The feeder unit 10 includes a framework structure which supports a storage bin 12 at the top of the unit and a receiving bin 14 at the bottom of the unit. The storage bin 12 is in the form of a hopper having upright side walls and sloping bottom walls which slope toward one another and toward a discharge opening in the bottom of the hopper. A measuring means is mounted adjacent to the discharge opening of the hopper for receiving material from the hopper and for discharging measured amounts of the material into the receiving bin 14. The receiving bin 14 holds the measured quantity of material until it is desired to release the material for distribution into the ground, and then the measured material is released through an end gate 16 which is raised to permit the dispensing of material from the receiving bin 14.

Figure 2:
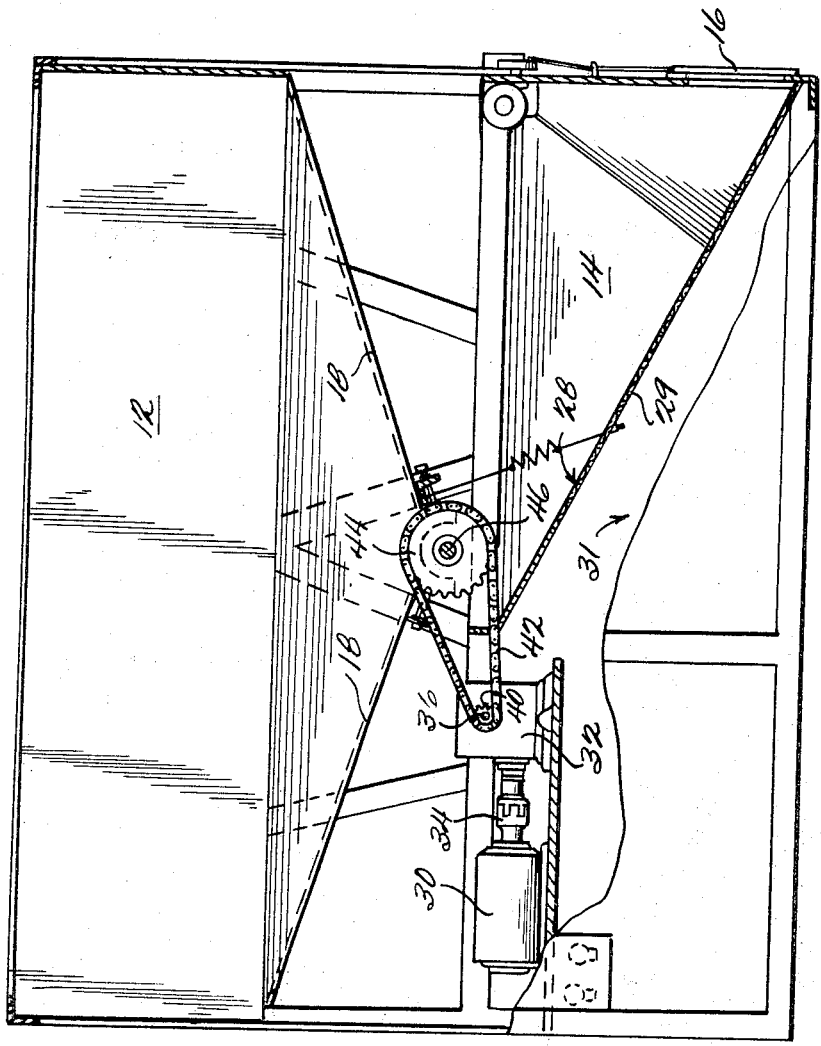
FIGURE 2 is a side elevational view of the feeder apparatus with portions cut away to show detail of a driving means for the rotatable measurement cylinders.

FIGURES 2, 3, and 4 illustrate the relationship of the storage bin 12 to the receiving bin 14, and the measuring and dispensing means is shown in greater detail. FIGURE 2 illustrates downwardly sloping bottom walls 18, the storage bin 12, and the bottom walls slope toward an opening which is provided transversely across the width of the storage bin 12. A measuring means is interposed so as to cover all of the opening in the bottom of the storage bin 12 and as seen in FIGURES 3 and 4 the measuring means comprises two measurement cylinders 22 and 24 which are mounted on a common horizontal axis for rotation on separate shafts, and a portion of the storage bin opening between the two cylinders is covered at 25 to prevent feed material from falling into a space between the two cylinders. The measurement cylinders include pockets for receiving predetermined quantities of feed material from the storage bin, and as the cylinders are rotated, material is received in a pocket and then discharged onto a sloping floor 28 of the receiving bin. Two sizes of cylinders 22 and 24 are shown, and each cylinder can be separately rotated from the other so that varying capacities for the two cylinders can be combined for obtaining accurate measurements of feed material out of the storage bin 12 and into the receiving bin 14. FIGURE 2 also shows a portion 29 of the receiving bin floor 28 as being apertured to permit passage of undersized particles into a separate receiving section 31. The undersized particles are thus separated for later removal and salvage when the truck returns from a range feeding operation. The apertured portion 29 of the sloping wall 28 may be in the form of a screen member or any other arrangement for permitting the screening out of undersized feed particles or crumbs.

FIGURES 2, 3, and 4 show a driving and control arrangement for rotating the measurement cylinders 22 and 24. Although the two cylinders are mounted for rotation about a common axis, it will be understood that the mounting shaft for the cylinder 22 is separate from and can be driven separately from a mounting shaft for the cylinder 24. An electric motor means 30 is mounted within the feeder unit and connected to a battery or other source of current for driving the measurement cylinders through a gear reduction box 32. The gear reduction box 32 includes conventional gearing arrangements for reducing the output rotation of the electric motor 30 as received through the coupling 34, and the output speed from the gear reduction box 32 is an appropriate speed of rotation for operating the measurement cylinders 22 and 24. Opposed output shafts 36 and 38 extend from the gear reduction box, and each shaft carries a sprocket wheel 40 for driving an endless chain associated with one of the measurement cylinders. As seen in FIGURE 2, an endless chain 42 is drivingly connected to a sprocket wheel 44 mounted on a shaft 46 carrying the measurement cylinder 24. In a similar manner, the measurement cylinder 22 is driven by an endless chain 48 which is connected between sprocket wheels carried on the output shaft 38 of the gear reduction box and on a mounting shaft 50 for the measurement cylinder 22.

The measurement cylinders 22 and 24 are separately driven in opposite rotational directions from each other by a novel arrangement with the gear reduction box 32. The opposed output shafts 36 and 38 which extend from the gear reduction box are each driven by an operation of the electric motor 30, and the direction of rotation for each of the output shafts depends upon whether the electric motor is driven in a forward or reverse direction. The sprocket wheels 40 which are carried on each of the output shafts 36 and 38 are mounted on the shafts by clutch bearing structures which function as one-way clutch devices. Such structures do not form a separate part of this invention; however, suitable constructions for this use are described in the Benson et al. Patents 3,184,020 and 3,194,368. Each of the mentioned patents described a clutch bearing construction which allows a driven shaft to rotate freely when driven in a first direction relative to the clutch bearing while preventing free rotation within the bearing when driven in a second direction relative to the clutch bearing. Each of the sprocket wheels 40 is mounted to provide a one-way driving action for the endless chain associated therewith, and each of the sprocket wheels 40 is mounted rotational driving movements in opposite directions from one another. Thus, the output shaft 36 and its associated sprocket wheel 40 is mounted on a clutch bearing relative to the shaft 36 so that the sprocket wheel is turned in one rotational direction only. When the motor is being driven in that direction, the sprocket wheel is turned, but when the motor is reversed there is a free rotation of the shaft 36 within the clutch bearing carried by its associated sprocket wheel. Conversely, the sprocket wheel 40 which is mounted on the opposed shaft 38 is arranged to be driven in an opposite direction from the sprocket wheel on the shaft 36. Thus, the shaft 38 drives its sprocket wheel only when the electric motor is reversed from the direction in which it drives the sprocket wheel associated with the output shaft 36. With this arrangement, each of the separate measurement cylinders 22 and 24 can be selectively and separately driven by selecting a particular direction of operation for the electric motor 30. When the electric motor is driven in a first direction only, one of the measurement cylinders rotates, and when the electric motor is reversed, only the second of the measurement cylinders can rotate. Thus, the two cylinders can be combined in a preselected number of rotations for each which will give a desired and accurate measurement of material dumped from the storage bin 12 into the receiving bin 14.

FIGURES 5, 6 and 7 illustrates constructional features of the measurement cylinders in greater detail. Each of the separate cylinders 22 and 24 include pockets 52 for receiving material from the storage bin 12. Further, each cylinder can be separately rotated from the other so as to carry a received measurement of material out of the storage bin for dispensing into the receiving bin 14. The pockets 52 are illustrated as being formed by generally dividing each cylinder longitudinally into two halves as seen in the FIGURE 6 cross-section. Each cylinder includes an outside housing 54 which defines the cylindrical configuration for the measurement cylinder, and the housing includes openings at 56 to permit passage of material into and out of the pockets 52 formed within the measurement cylinders. The pockets may be formed or designed in any suitable configuration, but FIGURE 6 illustrates a pocket formation which results from dividing the measurement cylinder into two parts by a central longitudinal wall 58. The wall 58 may be attached to the mounting shaft of the cylinder in any well known manner, such as by welding or by bolting thereto. Each of the separate cylinders 22 and 24 is designed to measure a known quantity of feed material which is to be dispensed. As an example of a typical measurement which has been used, the larger measurement cylinder 22 may be designed to receive ten pounds of a particular feed material each time one of its pockets 52 is filled from the storage bin 12. In a similar manner, the smaller measurement cylinder 24 may be designed to receive one pound of feed material each time one of its pockets is filled from the storage bin 12. With this arrangement, the total required amount of feed can be calculated and dispensed by rotating the larger measurement cylinder 22 for a sufficient number of times to dispense a total quantity which is within ten pounds of the desired total, and then the smaller cylinder 24 can be rotated a sufficient number of times to dispense single pound units to arrive at the desired total quantity. Since varying types of feed material, or other material to be dispensed, may have varying densities, a provision is made for adjusting the capacity of individual pockets 52 for each of the cylinders 22 and 24. Such an adjustment means is illustrated in FIGURE 7 and is shown as comprising a plate 60 which can be inserted into a pocket 52 for changing the volume of the pocket. Such a plate or other filler device can be attached to any suitable portion of the measurement cylinder by removable screws or other fastening devices. Thus, adjustment plates 60 can be added to pockets in either of the cylinders, as required, to accommodate varying types of materials which may be dispensed. It will be appreciated from the views of FIGURES 6 and 7 that when a pocket 52 is an upper position, feed material is received by gravity through an upwardly directly opening 56, and then when the cylinder is rotated the measured feed material is carried around and dumped into the receiving bin from the downwardly directly opening. For each complete rotation of each measurement cylinder, there are two measurements; however, this can be varied by changing the number of pockets for any given measurement cylinder construction.

FIGURES 8 and 9 illustrate electrical contact means for use with a counting circuit which keeps a running total count of feed material dispensed. As seen in FIGURE 3, the contact devices 62 and 64, associated with the cylinders 22 and 24 respectively, are connected in a circuit which operates a counter device associated with a remote control unit for the entire system. The counter device is of a conventional construction, and serves to indicate the total number of weight units being dispensed by the feeder. The contact arm 62 for the measurement cylinder 22 is mounted to contact a side plate portion 66 at one end of the measurement cylinder. The side plate portion includes contact elements 68 which make a ground contact with the positive contact arm 62. As the measurement cylinder rotates, two separate groups of the ground contact elements 68 will pass by and engage the positive contact arm 62. The two groups of ground elements correspond to the two measurement pockets contained within the cylinder, and the groups each contain a number of elements which correspond to the number of weight units being dispensed by a single pocket of the cylinder. In the FIGURE 8 illustration, there are shown ten contact elements in each of the groups, and this is exemplary of a measurement cylinder which dispenses ten pounds of feed material from each of its two pockets. FIGURE 9 shows a similar arrangement for the contact arm 64 associated with the smaller measurement cylinder. This arrangement would apply to the example of a smaller measurement cylinder 24 having one pound capacity pockets contained therein. It will be appreciated that the two views for FIGURES 8 and 9 are shown in opposite directions from one another, as indicated in FIGURE 3.

FIGURES 10 and 11 illustrate stop gear devices associated with each of the separate cylinders 22 and 24 to prevent one of the cylinders from backing up while the other cylinder is being rotated in its particular operational direction. FIGURE 10 illustrates a stop gear associated with the smaller cylinder 24, and FIGURE 11 shows a corresponding arrangement for the larger cylinder 22. Each of the views for FIGURES 10 and 11 is taken in opposite directions along the rotational axis for the measurement cylinders, and the stop gears have been omitted from FIG. 3 for clarity. However, the gears for each of the separate measurement cylinders may be affixed to the contact plates (FIGS. 8 and 9) associated with each of the cylinders. The stop gear arrangement is illustrated in the form of a pawl and ratchet device, and a ratchet gear 72 is rigidly affixed to each of the separate cylinders 22 and 24 for rotation therewith. Pawls 74 may be mounted in any suitable way to fall into the notches of the ratchet gears 72 and a typical mounting arrangement is illustrated. Spring members 76 operate to apply sufficient tension to the pawl members to assure an engagement of the pawl in each successive notch of its associated ratchet gear. In this manner, each of the separate cylinders is prevented from backing up from whatever stopping position it is in when a measurement cycle for the cylinder is completed.

FIGURE 12 illustrates some of the detailed construction associated with a remotely controlled lifting mechanism for the end gate 16, and this figure should be considered in conjunction with further details shown in FIGURES 3 and 4. The end gate 16 is mounted to cover an opening 78 formed at the lower back end of the unit, and the end gate can be moved to uncover the opening 78 by lifting it in guide channels 80. When the end gate is lifted, material which has been measured and dumped into the receiving bin 14 is then discharged from the feeder unit through the opening 78. In normal operations for range feeding, the measured material is discharged directly onto the ground, and a spreading action can be accomplished by driving the vehicle in a forward direction while the material is being gravity discharged through the opening 78. A remotely controlled mechanism is provided for lifting and lowering the end gate 16, and this mechanism includes a wheel 82 which is rotated by a motor means 84. A lifting cable 86 is connected between the end gate 16 and a connecting post 88 eccentrically mounted on the wheel 82. A guide ring 90 may be affixed to the upright rear panel of the receiving bin for guiding the lifting cable 86 in its up and down movements. It will be appreciated that as the wheel 82 is rotated, the eccentric mounting post 88 will carry the cable 86 in directions of movement which will result in a lifting or lowering of the end gate 16. The motor 84 drives a mounting shaft 92 for the wheel through a worm gear reduction indicated generally at 94. The wheel 82 may be mounted on the shaft 92 in any desired manner, however, it has been found that a one-way clutch mounting for the wheel on the shaft provides a desired lifting and lowering action. As the wheel is rotated from a position where the end gate 16 is closed over the opening 78, the cable 86 is drawn upwardly thus lifting the end gate 16. When the post 88 reaches an uppermost peak of movement, the clutch mounting of the wheel 82 on the shaft 92 permits the wheel to rotate freely, letting the end gate fall by gravity to its lowermost position. The wheel 82 is also illustrated (in FIGURE 4) as having a projecting portion 96 which normally contacts a switch means 98 when the end gate 16 is in a closed position. The switch means 98 is connected to a circuit which lights an indicator light in a control unit when the end gate is open, and the rotation of the wheel 82 causes the light to be lighted by a movement of the projecting portion 96 out of engagement with the switch means 98.

FIGURE 13 illustrates a control unit 100 for use with the feeder of this invention, and the control unit may be mounted or carried within the driver compartment of the vehicle so that all operations in measuring and dispensing feed material can be conducted from the driver's position in the vehicle. The control unit 100 includes a manually operated switch 102 for selectively operating the two measurement cylinders. Any suitable circuiting may be provided for the control unit and the various devices which are to be controlled and operated, and a typical circuiting is illustrated. The switch 102 can be actuated to an off position and to positions for actuating the electric motor 30 in either forward or reverse driving movements. As discussed above, the forward drive of the electric motor 30 actuates only one of the measurement cylinders through an output shaft from the gear reduction box 32, while a reverse drive of the motor actuates only the other of the measurement cylinders. The control unit includes appropriate indicia for the switch handle 102, so that the driver can select an appropriate cylinder for actuation. Once a measurement cylinder is actuated, the contact arm for that cylinder transmits counting signals to a conventional counter device 104 which tallies the number of units being measured by the actuated cylinder. When the closest approximate total has been measured, the driver can then throw the switch 102 to a position which actuates the smaller of the two measurement cylinders, and the counting is continued until an accurate total has been reached. Of course, it is to be understood that only one of the measurement cylinders may be actuated for certain operations, and the measuring units may be in units of volume as well as the above-described units of weight.

When a measuring sequence has been completed, the driver then may drive the vehicle to a desired position for distributing the measured feed material onto the ground, and when this position is reached a gate switch button 106 is pressed to operate the end gate motor 84. As described earlier, the end gate gate motor lifts the gate 16, and while the gate is open an indicator light 108 is lighted on the control unit.

FIGURES 14, 15 and 16 illustrate a means for increasing the capacity of the storage bin portion 12 of the unit. Looking to FIGURE 14, it can be seen that the normal storage bin 12 of the unit has been modified by adding framing segments 110 to the four corners of the bin 12. The framing segments 110 are constructed to be easily inserted onto a horizontal flange 112 carried by the lower framing members of the bin 12, and as illustrated in FIGURES 15 and 16, each framing segment 110 includes spaced upright elements for receiving panel members therebetween. Thus, when the framing segments 110 have all been inserted into position, panels 114 can be dropped into receiving channels formed by the spaced elements of each segment. In this way, considerable volume capacity can be added to the storage bin 12 with very little difficulty. Locking devices 116 of any suitable construction may be included on the panels 114 for temporarily locking the panels into position, if desired.

Having described the constructional features of the present invention, it can now be appreciated that an improved device has been devised for accurately measuring and distributing feed pellets, or other feed material, onto a range for feeding livestock. The principles of this invention may likewise be applied to the measuring and distributing of other materials. Although the invention has been described with reference to a preferred embodiment many variations will become obvious to those skilled in the art. For example, the number and capacity of the measurement cylinders may be changed, and each cylinder may be designed to contain a single pocket or more than the two pockets described. The output shafts from the gear reduction box may be arranged in any convenient position, and it is possible to use a single output shaft carrying two sprocket wheels for the two cylinders, if desired. In such a modification the sprocket wheels would be clutch mounted to be driven in opposite directions, as described for the opposed output shafts. A further modification would arrange the measurement cylinders on a common axis of rotation with the smaller measurement cylinder located in the center of a divided larger measurement cylinder having one portion on each side of the smaller cylinder. Such an arrangement would provide for a better balance in the driving system for the cylinders inasmuch as the driving forces would be applied to the middle part of the drive shaft rather than to one end of the drive shaft for the larger cylinder. In such an arrangement the larger cylinder would be designed in two halves having a total capacity of the single larger cylinder described above, and each of the halves would rotate simultaneously on a common shaft. The common shaft for the two large cylinders could pass through a hollow shaft for the small cylinder, thus permitting the larger or smaller cylinder to be separately actuated as above. The chain drive for the smaller cylinder would be attached to a sprocket wheel at one end of the hollow drive shaft for the smaller cylinder, while the chain drive for the larger cylinder portions would be attached to a sprocket wheel carried by one of the portions and at a location near the midpoint of the long mounting shaft for the two larger cylinder portions.

Other variations and equivalent structures will be suggested by this invention, and it is intended that all such variations and equivalents be included within the scope of this invention.

What is claimed is:

1. Apparatus for dispensing measured quantities of feed material onto a range for feeding livestock comprising:
   a storage bin for carrying a large quantity of feed material for dispensing at various points on a range, said storage bin having a bottom opening through which feed material may pass into two measurement cylinders rotatably mounted adjacent said bottom opening;
   a receiving bin for receiving and holding a measured quantity of feed material which is discharged from the storage bin by a rotation of one or both of said two measurement cylinders, said receiving bin having a dispensing opening which is opened and closed by a gate means;
   driving means for separately rotating said measurement cylinders;
   control means for actuating said driving means for rotating one or the other of said two measurement cylinders; and
   a separate control means for operating said gate means, whereby a measured quantity of feed material can be dumped from the storage bin into the receiving bin and then dispensed from the receiving bin at a desired time by opening the gate means associated with the receiving bin.

2. The apparatus of claim 1 wherein said receiving bin includes a floor portion having a plurality of small apertures therethrough for separating out undersized particles and crumbs from pellitized feed material being dispensed by said apparatus, and including a salvage bin in communication with said flood portion for receiving screened out particles and crumbs.

3. The apparatus of claim 1 wherein each of said two measurement cylinders measure a different quantity of feed from the other, whereby one cylinder may be rotated to measure larger quantities in an approximation of a total desired amount and the second cylinder may be rotated to bring the approximation up to the desired amount by adding smaller quantity increments.

4. The apparatus of claim 1 wherein each of said two measurement cylinders includes pocket means for receiving known volumes of feed material, and including means for adjusting the volume of any pocket means of either measurement cylinder.

5. The apparatus of claim 1 wherein said driving means for rotating the two measurement cylinders comprises:
a reversible motor means drivingly connected to a reduction gear box, said reduction gear box having two opposed output shafts;
a separate driving connection between each of said output shafts and a respective measurement cylinder so that each output shaft operates a separate cylinder, one of said driving connections being operative only when said motor means is driven in a first direction with the second of said driving connections being inoperative during said first direction of motor driving, and the second of said driving connections being operative only when said motor means is driven in a reverse direction from said first direction, with first driving connection being inoperative during said reverse drive of the motor, whereby said two measurement cylinders are separately actuated for rotation in opposite directions to effect measuring and dumping functions.

6. The apparatus of claim 5 and including braking means for each of said measurement cylinders for preventing a reverse rotation of a given cylinder in a direction opposite to its normal operating direction of rotation.

7. The apparatus of claim 5 wherein said separate driving connections for each of said output shafts comprises a chain drive means connected to said output shaft through a one way clutch means and connected to a respective cylinder by a sprocket wheel affixed to said cylinder and rotatable in a common axis with said cylinder.

8. The apparatus of claim 5 wherein said motor means comprises an electric motor means which is driven in forward or reverse or stopped by said first named control means.

References Cited
UNITED STATES PATENTS

| | | | |
|---|---|---|---|
| 1,762,056 | 6/1930 | Galan | 222—278 X |
| 3,055,551 | 9/1962 | Johnson | 222—333 X |

ROBERT B. REEVES, *Primary Examiner.*

H. S. LANE, *Assistant Examiner.*